UNITED STATES PATENT OFFICE.

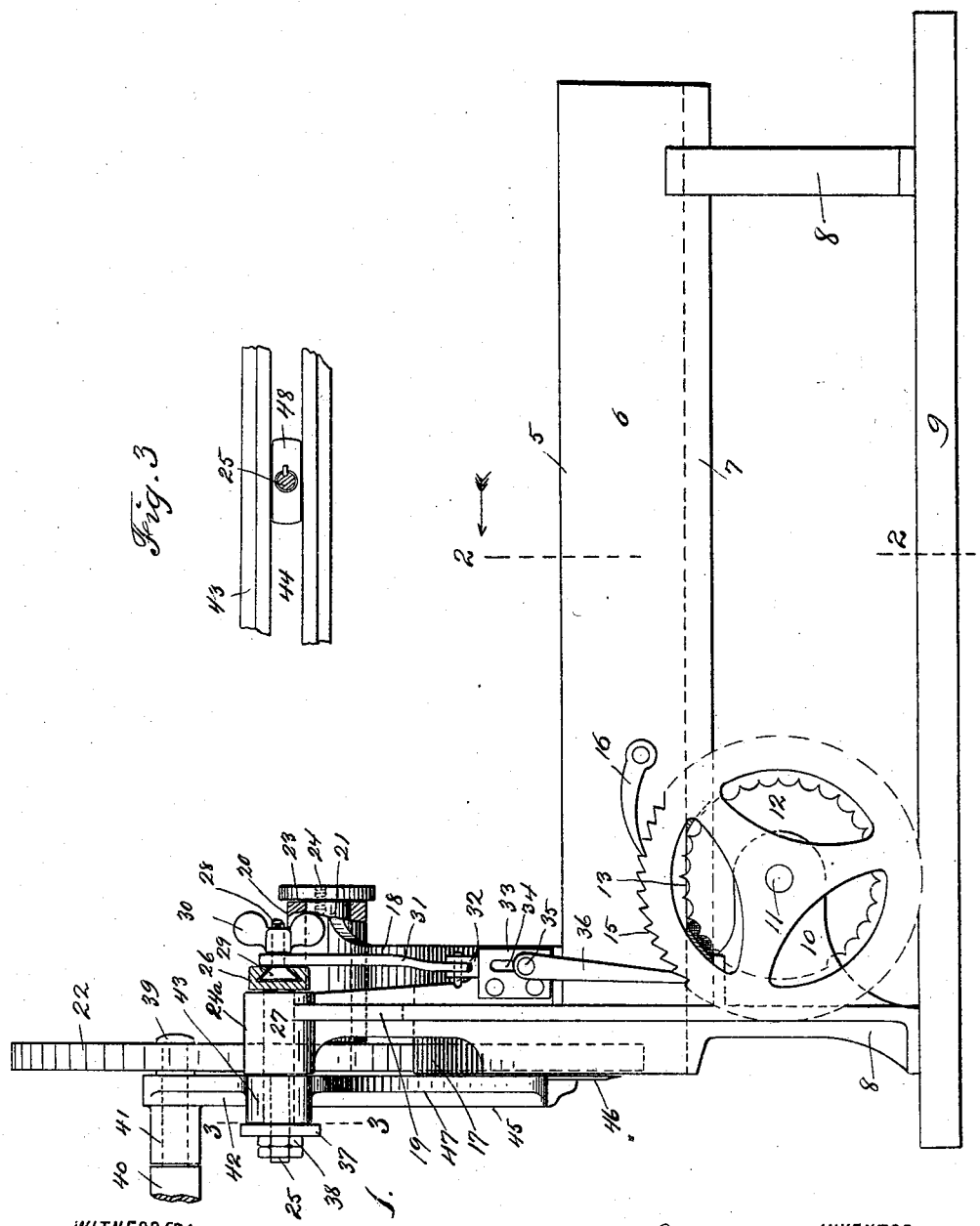

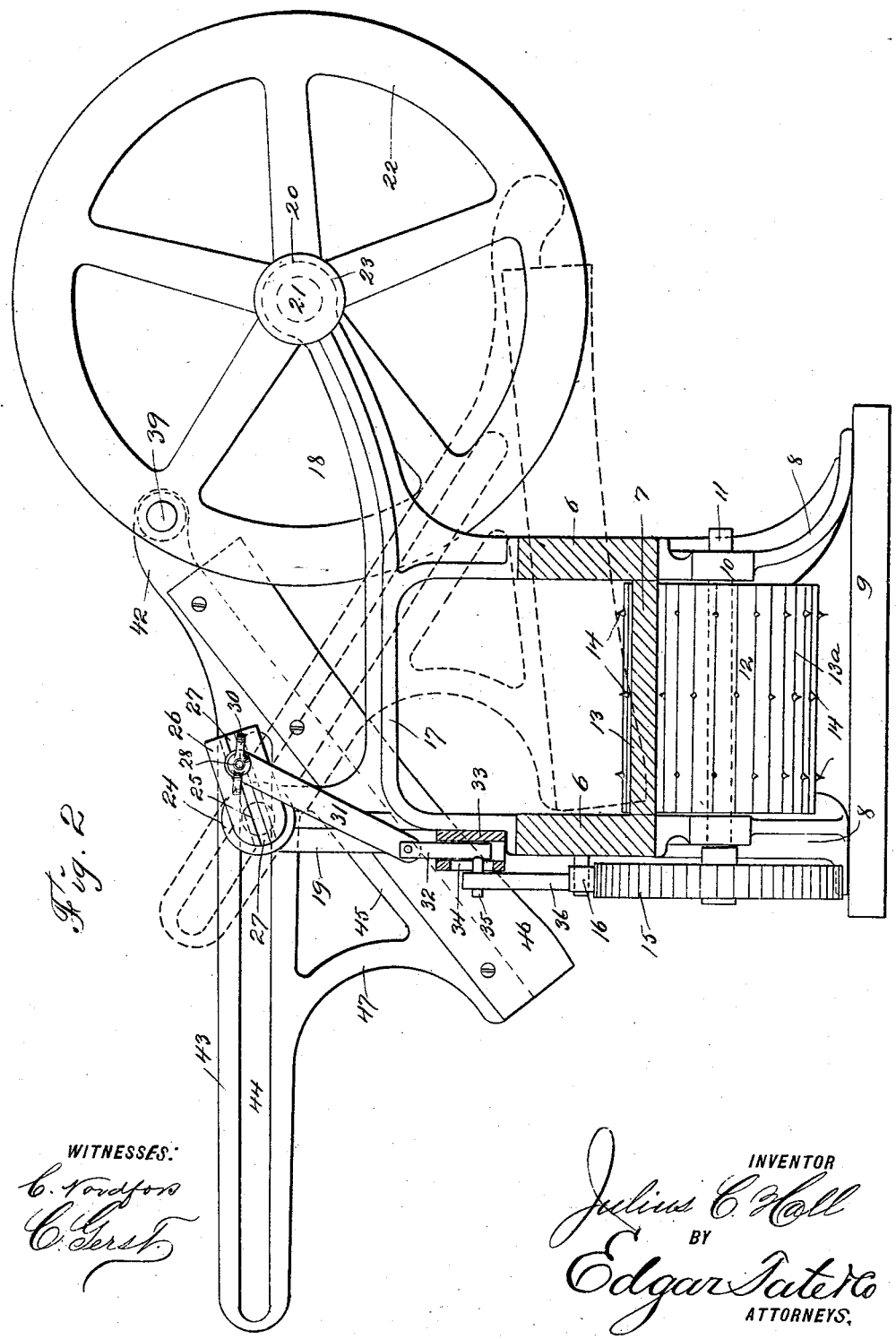

JULIUS C. HALL, OF WALLINGFORD, CONNECTICUT.

CHOPPING-MACHINE.

SPECIFICATION forming part of Letters Patent No. 595,387, dated December 14, 1897.

Application filed April 16, 1897. Serial No. 632,402. (No model.)

*To all whom it may concern:*

Be it known that I, JULIUS C. HALL, a citizen of the United States, residing at Wallingford, in the county of New Haven and State of Connecticut, have invented certain new and useful Improvements in Chopping-Machines, of which the following is a full and complete specification, such as will enable those skilled in the art to which it appertains to make and use the same.

This invention relates to chopping-machines, and the object thereof is to provide an improved machine of this class which may be used for cutting food for cattle, horses, and other animals, and which may also be used for various other purposes—such as cutting meat, vegetables, and other products; and with this and other objects in view the invention consists in the construction, combination, and arrangement of parts hereinafter described and claimed.

The invention is fully disclosed in the following specification, of which the accompanying drawings form a part, in which the separate parts of my improvement are designated by the same numerals of reference in each of the views, and in which—

Figure 1 is a side view of my improved machine, part of the construction being shown in section; Fig. 2, a section on the line 2 2 of Fig. 1, and Fig. 3 a section on the line 3 3 of Fig. 1.

In the practice of my invention I provide an oblong frame or box 5, which consists of side boards 6 and a bottom 7, and said frame or box is supported by legs 8, and the entire device may be mounted on a base-plate 9, if desired, and the legs 8 are provided at one end with backwardly-directed projections or bearings 10, in which is mounted a shaft 11, and mounted on the shaft 11 is a feed-roller 12, the upper side of which passes through a transverse opening in the bottom 7, as shown at 13 in Figs. 1 and 2.

The feed-roller 12 may be made in any desired manner, but the surface thereof is preferably composed of longitudinal strips 13ª, which are provided with projections or teeth 14, and mounted on one end of the shaft 11 is a large ratchet-wheel 15, and pivotally connected with one side of the box or frame is a pawl 16, which operates in connection therewith.

That end of the box or casing 5 beneath which the shaft 11 is mounted is supported by a metal frame, of which the adjacent legs 8 form a part, said legs being projected upwardly and connected above the box or casing by a cross-bar 17, and said frame is provided at one side with an outwardly-directed arm 18 and at the opposite side and over the ratchet-wheel 15 with an upwardly-directed extension 19.

The arm 18 is provided at its outer end with a tubular hub 20, through which is passed a shaft 21, on which is mounted a wheel 22, and said shaft is held in said hub 20 by a cap 23, which is provided with a screw 24, which passes into the shaft, and the upwardly-directed extension 19 of the end frame is provided with a tubular hub 24ª, through which passes a shaft 25, and the shaft 25 is provided at its inner end with an oblong head 26, in which is formed a groove 27, which is triangular in cross-section, and I also provide a screw-threaded bolt 28, which is provided with a head 29, which is rectangular in form in cross-section and adapted to move in the groove 27 and on which is mounted a thumb-nut 30, and mounted on the bolt 28, between the thumb-nut 30 and the oblong head 26, is a rod 31, which is pivotally connected at its lower end with a vertically-movable bar 32, which passes into a keeper 33, secured to the side of the frame in which the end of the box or casing 5 is mounted, and said keeper is provided with a slot 34, through which passes a pin 35, which is secured to the bar 32, and connected with said pin 35 is a pawl 36, which is also adapted to operate in connection with the ratchet-wheel 15.

The outer end of the shaft 25 is provided with a washer 37, which is held thereon by one or more nuts or burs 38, and pivotally connected with the rim of the wheel 22 at 39 is a crank-pin provided with a handle 40, and mounted on said crank-pin is a tubular sleeve 41, with which is connected or on which is formed the arm 42 of a triangular frame consisting of a bar 43, which is provided with a longitudinal slot 44, and a bar 45, to which the cutting-blade 46 is secured, and said bars 43 and 45 are connected by a brace-bar 47.

The shaft 25, which is carried by the tubular hub 24ª, passes through the slot 44 in the bar 43 and is provided with an oblong head 48, which is keyed thereto and which moves in said slot, and the operation will be readily understood from the foregoing description when taken in connection with the accompanying drawings and the following statement thereof.

The material to be cut is placed in the box or casing 5 and pressed upon the feed-roller 12, and the wheel 22 is revolved by means of the crank-rod 39, connected therewith, or the handle 40 of said crank-rod, and as said wheel is revolved the feed-roller 12 is moved forward step by step, the movement of said feed-roller being an intermittent movement, and at each revolution of said wheel 22 the cutting-blade 46 describes a circle and passes downwardly over the end of the box or casing 5 and transversely thereof, as will be readily understood, the motion of the cutting-blade, while being substantially circular, being also transversely of the bottom portion of the box or casing. The motion of the feed-roller 12 is such that only a small portion of the article or articles to be cut is fed forward at each revolution of the wheel 22, and this operation is cut off by the blade 46 at the same time.

The motion of the head 26 of the shaft 25 is an up-and-down motion, and this operation gives to the ratchet-wheel 15 the intermittent movement hereinbefore described, and the feed-roller, which is mounted on the shaft of the ratchet-wheel 15, is thus given a similar movement, and the pawl 16 prevents the reverse movement of the ratchet-wheel 15 and the feed-roller 12.

This device is simple in construction and operation and perfectly adapted to accomplish the result for which it is intended, and it will be apparent that changes in and modifications of the construction of the various parts thereof, as herein shown and described, may be made without departing from the spirit of my invention or sacrificing its advantages.

Having fully described my invention, I claim as new and desire to secure by Letters Patent—

1. A chopping-machine comprising an oblong box or casing which is open at one end, and provided with suitable supports, said box or casing being also provided at one end with a frame which is projected above the same, and which is provided at one side with a laterally-projecting arm, and at the other side with an upwardly-directed extension, a wheel supported by said arm, and provided with a crank-rod, and a triangular frame connected with said crank-rod, and the upper portion of which consists of a bar in which is formed a longitudinal slot, and the lower portion thereof being provided with a cutting-blade, a shaft mounted in said upwardly-directed portion of the frame, and passing through the slot in the triangular frame, and on one end of which is an oblong head, and said frame being provided with a feed-roller which is mounted below the end of the box or casing, and which projects upwardly through the bottom thereof, a ratchet-wheel mounted on the shaft of said feed-roller, at one side of the box or casing, said ratchet-wheel and said oblong head being in operative connection, substantially as shown and described.

2. A chopping-machine consisting of an oblong box or casing which is open at one end, and suitably supported, said box or casing being also provided at the open end with a frame which is projected upwardly, and provided at one side with an arm, and at the opposite side with an upwardly-directed extension, a wheel supported by said arm and provided at one side with a crank-rod, a triangular frame connected with said crank-rod, and provided at the lower side thereof with a cutting-blade, and at the upper side thereof with a longitudinal slot, a shaft mounted in the upper end of the said extension of the frame and projecting through said slot and provided at one end with an oblong head, a feed-roller mounted below the box or casing and projecting upwardly through the bottom thereof, a ratchet-wheel mounted on one end of the shaft of said feed-roller, a rod connected with the oblong head of the shaft which passes through the slot in the triangular frame, a bar connected with the lower end of said rod and vertically movable in a keeper secured to said frame, and a pawl pivotally connected with said rod and adapted to operate in connection with said ratchet-wheel, substantially as shown and described.

3. A chopping-machine comprising an oblong box or casing, which is open at one end, and a feed-roller mounted beneath the open end of said box or casing and projecting upwardly through the bottom thereof, a frame connected with said end of said box or casing and provided at one side with an arm, and at the opposite side with an upwardly-directed extension, a wheel supported by said arm and provided at one side with a crank-rod, a triangular frame connected with said wheel and provided in its upper side with a longitudinal slot, and at its lower side with a cutting-blade, a shaft passing through said slot and through the upwardly-directed extension of the frame, and provided at one end with an oblong head, and operative devices connecting said head and said feed-roller whereby the latter is given an intermittent motion, substantially as shown and described.

In testimony that I claim the foregoing as my invention I have signed my name, in presence of the subscribing witnesses, this 13th day of April, 1897.

JULIUS C. HALL.

Witnesses:
C. A. HARRISON,
WM. N. MIX.